United States Patent
Wang et al.

(10) Patent No.: US 9,618,690 B2
(45) Date of Patent: Apr. 11, 2017

(54) LIQUID CRYSTAL DISPLAY DEVICE

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Cong Wang, Guangdong (CN); Peng Du, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 0 days.

(21) Appl. No.: 14/769,785

(22) PCT Filed: Jul. 17, 2015

(86) PCT No.: PCT/CN2015/084321
§ 371 (c)(1),
(2) Date: Aug. 21, 2015

(87) PCT Pub. No.: WO2017/008313
PCT Pub. Date: Jan. 19, 2017

(65) Prior Publication Data
US 2017/0010408 A1   Jan. 12, 2017

(30) Foreign Application Priority Data
Jul. 10, 2015  (CN) .......................... 2015 1 04062251

(51) Int. Cl.
*F21V 8/00* (2006.01)
*G02F 1/1368* (2006.01)
(Continued)

(52) U.S. Cl.
CPC ........... *G02B 6/0088* (2013.01); *G02B 6/009* (2013.01); *G02F 1/1368* (2013.01);
(Continued)

(58) Field of Classification Search
CPC ..... G02B 6/0088; G02B 6/009; G02F 1/1368; G02F 1/133514; G02F 1/133528;
(Continued)

(56) References Cited

U.S. PATENT DOCUMENTS 6,954,243 B2 * 10/2005 Ota .................... G02F 1/133512
349/110
8,681,292 B2 * 3/2014 Kim ..................... G02B 6/0073
349/64

(Continued)

*Primary Examiner* — Dennis Y Kim
(74) *Attorney, Agent, or Firm* — Andrew C. Cheng

(57) ABSTRACT

The present invention provides a liquid crystal display device. The device includes a light guide plate, a color filter substrate, an array substrate and a light shading tape. Wherein, a side wall of the concave slot is an incline slope, an edge of the color filter substrate is supported on the incline slope of the concave slot, an edge of a plastic frame is aligned with an edge of the array substrate, and a light shading tape for relatively fixing the color filter substrate and the light guide plate. The present invention can realize a narrow frame and no frame design of the liquid crystal display device. The structure of the display panel is simplified in order to simplify the manufacturing process and reduce the production cost.

13 Claims, 2 Drawing Sheets

(51) Int. Cl.
  *G02F 1/1335* (2006.01)
  *G02F 1/1343* (2006.01)
  *G02F 1/1333* (2006.01)

(52) U.S. Cl.
  CPC .... *G02F 1/13439* (2013.01); *G02F 1/133345* (2013.01); *G02F 1/133514* (2013.01); *G02F 1/133528* (2013.01); *G02F 1/134309* (2013.01); *G02F 2001/133357* (2013.01); *G02F 2201/121* (2013.01); *G02F 2201/123* (2013.01); *G02F 2201/46* (2013.01); *G02F 2202/104* (2013.01)

(58) Field of Classification Search
  CPC ......... G02F 1/134309; G02F 1/133345; G02F 1/13439; G02F 2001/133357; G02F 2201/46; G02F 2201/123; G02F 2201/121; G02F 2202/104
  See application file for complete search history.

(56) References Cited

U.S. PATENT DOCUMENTS

| | | | |
|---|---|---|---|
| 8,711,306 B2* | 4/2014 | Oohira | G02B 6/0081 349/110 |
| 9,256,023 B2* | 2/2016 | Chang | G02B 6/00 |
| 9,322,981 B2* | 4/2016 | Kim | G02F 1/133308 |
| 2014/0092625 A1* | 4/2014 | Lin | G02B 6/005 362/606 |
| 2015/0055372 A1* | 2/2015 | Wu | G02B 6/002 362/613 |
| 2015/0219824 A1* | 8/2015 | Kunimochi | G02B 6/0031 362/609 |
| 2015/0221684 A1* | 8/2015 | Kanda | H01L 27/1288 438/666 |
| 2016/0056415 A1* | 2/2016 | Yoo | H01L 51/5284 349/43 |

* cited by examiner

LIQUID CRYSTAL DISPLAY DEVICE

BACKGROUND OF THE INVENTION

1. Field of the Invention

The present invention relates to a display technology field, and more particular to a liquid crystal display device.

2. Description of Related Art

With reference to FIG. 1, and FIG. 1 is a liquid crystal display device 10 in the conventional art. An array substrate 11 of the liquid crystal display device 10 is adjacent to a light guide plate 13, and a color filter substrate 12 is far away from the light guide plate 13. An outer plastic frame 14 fixes a display panel 15 and a backlight module (not shown), and prevent the display panel 15 from sliding relatively in the plastic frame 14. Usually, a trench 141 is provided on the plastic frame 14 in order to enclose the display panel 15. However, the size of the plastic frame 14 will be increased, which is not conducive to a narrow frame design or no frame design of the liquid crystal display device 10. With further reference to FIG. 2, for blocking a light emitted from the light guide plate 13 from entering an area of the array substrate 11 where a thin-film transistor (TFT) 16 is located in order to ensure a display contrast ratio of the liquid crystal display device 10, a metal light shading layer 17 is provided below the TFT 16. However, the structure of the display panel 15 will become complicated so as to add the manufacturing process of the liquid display device 10 and increase the production cost.

SUMMARY OF THE INVENTION

The embodiment of the present invention provides a narrow frame or no frame liquid crystal display device.

In an embodiment of the present invention, a liquid crystal display device comprising: a back plate; a light guide plate located on the back plate and provided with a concave slot, wherein, a side wall of the concave slot is an incline slope, and a bottom surface of the concave slot is a light emitting surface of the light guide plate; an optical film located on the bottom surface of the concave slot; a display panel located above the optical film, and including an array substrate and a color filter substrate, wherein, the color filter substrate is adjacent to the optical film, and an edge of the color filter substrate is supported on the incline slope of the concave slot; a plastic frame disposed to surround a periphery of the light guide plate, wherein, one terminal of the plastic frame is fixed on the back plate, the other terminal of the plastic frame is fixed with the array substrate, and the plastic frame are aligned with an edge of the array substrate; a light source located between the plastic frame and a side surface of the light guide plate, and the side surface of the light guide plate is a light incident surface of the light guide plate; and a light shading tape for relatively fixing the color filter substrate and the light guide plate, wherein, light shading tape has a first terminal and a second terminal, the first terminal of the light shading tape is abutted against the plastic frame, and the second terminal of the light shading tape is abutted against or overlapped on an edge of the optical film; wherein, along a direction perpendicular to the display panel and facing toward the light guide plate, the array substrate includes: a base body; a polysilicon layer located on the base body; an insulation layer covering on the polysilicon layer and the base body, and is provided with two first contact holes; a gate electrode located on a region of the insulation layer corresponding to the polysilicon layer; an interlayer dielectric layer covering on the gate electrode and the insulation layer, and the interlayer dielectric layer is provided with two second contact holes corresponding to the two first contact holes; a source electrode and a drain electrode located on the interlayer dielectric layer, electrically connected with two terminals of the polysilicon layer through the two first contact holes and the two second contact holes; a planarization layer covering on the source electrode, the drain electrode and the interlayer dielectric layer, and the planarization layer is provided with a third contact hole; and a pixel electrode correspondingly located above the planarization layer, and electrically connected with the source electrode or the drain electrode through the third contact hole.

Wherein, the liquid crystal display device further includes a first polarizer and a second polarizer, the first polarizer is located on a side of the array substrate far away from the light guide plate, the second polarizer is located between the color filter substrate and the optical film, the second terminal of the light shading tape is clamped between the optical film and the second polarizer, or is abutted against an edge of the second polarizer.

Wherein, along a direction perpendicular to the display panel and facing toward the light guide plate, the array substrate further includes: a common electrode located on the planarization layer except a region corresponding to a thin-film-transistor (TFT) of the array substrate; and a passivation layer located on the planarization layer and the common electrode, and the passivation layer does not cover the third contact hole; wherein, the pixel electrode is located on the passivation layer.

Wherein, along a direction perpendicular to the display panel and facing toward the light guide plate, the gate electrode includes a chromium (Cr) metal layer, an aluminum (Al) metal layer and a molybdenum (Mo) metal layer stacked sequentially.

Wherein, the base body includes a substrate layer and a buffering layer formed on the substrate layer.

Wherein, the base body further includes a transparent electrode layer having a thickness d and located between the substrate layer and the buffering layer, $d=n*\lambda$, wherein, $\lambda$ is a wavelength of an incident light which enters the transparent electrode layer from a side of the array substrate far away from the light guide plate, n is a positive integral.

Wherein, the color filter substrate includes a black matrix layer, the black matrix layer is disposed corresponding to the polysilicon layer.

Wherein, along a direction perpendicular to the display panel and facing toward the light guide plate, a projection region of the optical film is located inside a region where the bottom surface of the concave slot is located.

In an embodiment of the present invention, a liquid crystal display device comprising: a back plate; a light guide plate located on the back plate and provided with a concave slot, wherein, a side wall of the concave slot is an incline slope, and a bottom surface of the concave slot is a light emitting surface of the light guide plate; an optical film located on the bottom surface of the concave slot; a display panel located above the optical film, and including an array substrate and a color filter substrate, wherein, the color filter substrate is adjacent to the optical film, and an edge of the color filter substrate is supported on the incline slope of the concave slot; a plastic frame disposed to surround a periphery of the light guide plate, wherein, one terminal of the plastic frame is fixed on the back plate, the other terminal of the plastic frame is fixed with the array substrate, and the plastic frame are aligned with an edge of the array substrate; a light source located between the plastic frame and a side surface of the light guide plate, and the side surface of the light guide plate is a light incident surface of the light guide plate; and a light shading tape for relatively fixing the color filter substrate and the light guide plate, wherein, light shading tape has a first terminal and a second terminal, the first terminal of the light shading tape is abutted against the plastic frame, and the second terminal of the light shading tape is abutted against or overlapped on an edge of the optical film.

Wherein, the liquid crystal display device includes a light source, the light source is located between the plastic frame and a side surface of the light guide plate, and the side surface of the light guide plate is a light incident surface of the light guide plate;

Wherein, the liquid crystal display device further includes a first polarizer and a second polarizer, the first polarizer is located on a side of the array substrate far away from the light guide plate, the second polarizer is located between the color filter substrate and the optical film, the second terminal of the light shading tape is clamped between the optical film and the second polarizer, or is abutted against an edge of the second polarizer.

Wherein, along a direction perpendicular to the display panel and facing toward the light guide plate, the array substrate includes: a base body; a polysilicon layer located on the base body; an insulation layer covering on the polysilicon layer and the base body, and is provided with two first contact holes; a gate electrode located on a region of the insulation layer corresponding to the polysilicon layer; an interlayer dielectric layer covering on the gate electrode and the insulation layer, and the interlayer dielectric layer is provided with two second contact holes corresponding to the two first contact holes; a source electrode and a drain electrode located on the interlayer dielectric layer, electrically connected with two terminals of the polysilicon layer through the two first contact holes and the two second contact holes; a planarization layer covering on the source electrode, the drain electrode and the interlayer dielectric layer, and the planarization layer is provided with a third contact hole; and a pixel electrode correspondingly located above the planarization layer, and electrically connected with the source electrode or the drain electrode through the third contact hole.

Wherein, along a direction perpendicular to the display panel and facing toward the light guide plate, the array substrate further includes: a common electrode located on the planarization layer except a region corresponding to a thin-film-transistor (TFT) of the array substrate; and a passivation layer located on the planarization layer and the common electrode, and the passivation layer does not cover the third contact hole; wherein, the pixel electrode is located on the passivation layer.

Wherein, along a direction perpendicular to the display panel and facing toward the light guide plate, the gate electrode includes a chromium (Cr) metal layer, an aluminum (Al) metal layer and a molybdenum (Mo) metal layer stacked sequentially.

Wherein, along a direction perpendicular to the display panel and facing toward the light guide plate, the gate electrode includes a chromium (Cr) metal layer, an aluminum (Al) metal layer and a molybdenum (Mo) metal layer stacked sequentially.

Wherein, the base body further includes a transparent electrode layer having a thickness d and located between the substrate layer and the buffering layer, $d=n*\lambda$, wherein, $\lambda$ is a wavelength of an incident light which enters the transparent electrode layer from a side of the array substrate far away from the light guide plate, n is a positive integral.

Wherein, the color filter substrate includes a black matrix layer, the black matrix layer is disposed corresponding to the polysilicon layer.

Wherein, along a direction perpendicular to the display panel and facing toward the light guide plate, a projection region of the optical film is located inside a region where the bottom surface of the concave slot is located.

In the liquid crystal display device of the embodiment of the present invention, the color filter substrate is adjacent to the light guide plate. Through the light shading tape and the concave slot of the light guide plate to support and fix the color filter substrate. At this time, an edge of the array substrate is aligned with an edge of the plastic frame so as to maximally reduce the width of the plastic frame in order to be conducive to a narrow frame and no frame design for the liquid crystal display device.

DETAILED DESCRIPTION OF THE PREFERRED EMBODIMENT

The following content combines figures and embodiments for detail description of the present invention.

Figure 3:
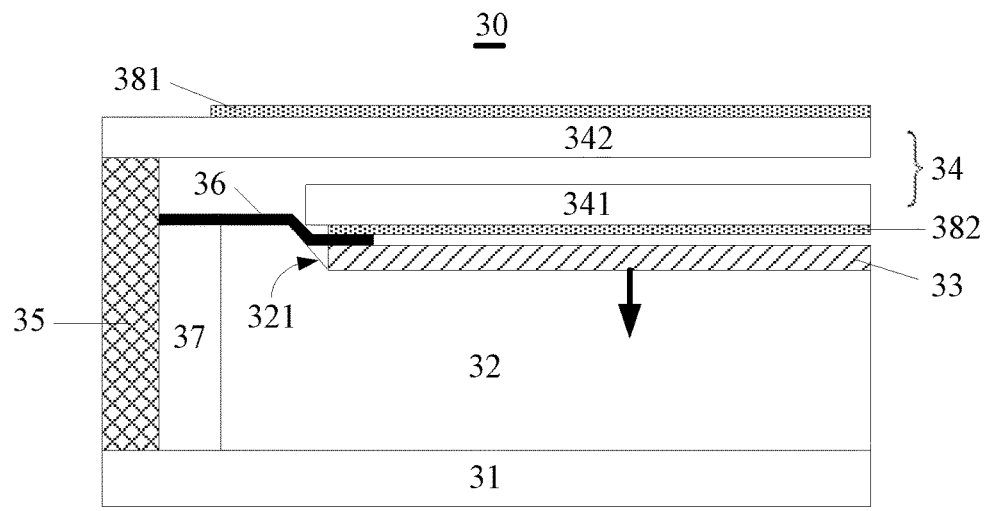
FIG. 3 is a schematic structure diagram of a liquid crystal display device according to an embodiment of the present invention.

With reference to FIG. 3, a liquid crystal display device 30 of the embodiment of the present invention includes a back plate 31, a light guide plate 32, an optical film 33, a display panel 34, a plastic frame 35 and a light shading tape 36. Wherein, the light guide plate 32 is located on the back plate 31 and is provided with a concave slot 321. A side wall of the concave slot 321 is an incline slope. A bottom surface of the concave slot 321 is a light emitting surface of the light guide plate 32. The optical film 33 is located on the bottom surface of the concave slot 321. An area of the optical film 33 is smaller than or equal to an area of the bottom surface of the concave slot 321. Preferably, along a direction (as a direction shown by an arrow in the figure) perpendicular to the display panel 34 and faced toward the light guide plate 32, a projection region of the optical film 33 is located inside a region where the bottom surface of the concave slot 321 is located. Of course, the area of the optical film 33 can also be larger than an area of the bottom surface of the concave slot 321. The display panel 34 is located above the optical film 33, and the display panel 34 includes a color filter substrate 341 and an array substrate 342. The plastic frame 35 surrounds a periphery of the light guide plate 32. One terminal of the plastic frame 35 is fixed on the back plate 31, and the other terminal of the plastic frame 35 is fixed with the array substrate 342.

Figure 1:
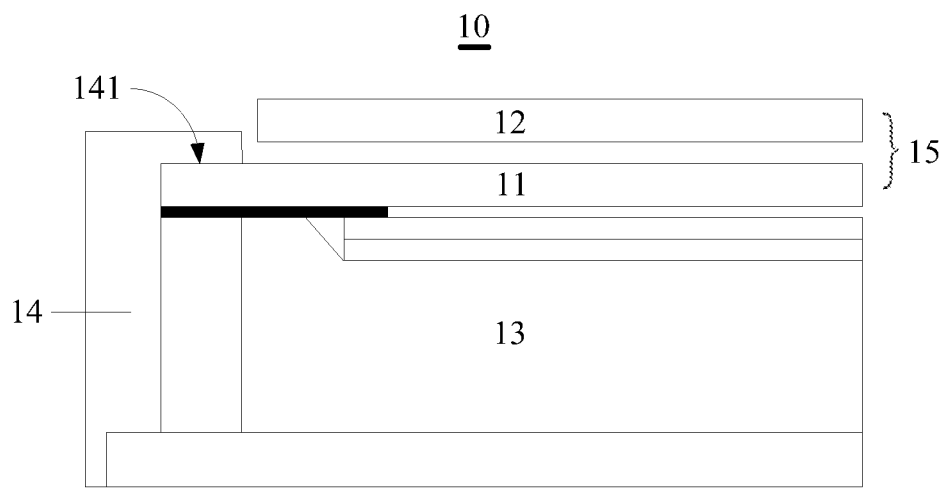
FIG. 1 is a schematic structure diagram of a liquid crystal display device according to an embodiment of the conventional art.

The difference between the present invention and the embodiment shown in FIG. 1 is that: in the present invention, the color filter substrate 341 is adjacent to the optical film 33 (or the light guide plate 32). An edge of the color filter substrate 341 is supported on the incline slope of the concave slot 321 of the light guide plate 32. Besides, one terminal of the opaque light shading tape 36 is abutted against the plastic frame 35. The other terminal of the light shading tape 36 is abutted against an edge of the optical film 33 or overlapped on the optical film 33. Accordingly, the present invention can not only prevent an outer-lead-bonding (OLB) region of the liquid crystal display device 30 from generating a light leakage phenomenon, but also can use an adhesive on the light shading tape 36 to realize a fixing between the color filter substrate 341 and the light guide plate 32 so that the plastic frame 35 does not require to dispose a trend 141 as shown in FIG. 1, a display panel 34 can be fixed on the light emitting surface of the light guide plate 32. Accordingly, the plastic frame 35 and an edge of the array substrate 342 can be aligned in order to maximally reduce a width of the plastic frame 35 and conducive to a narrow frame or no frame design of the liquid crystal display device 30.

Based on the purpose of the present invention, the liquid crystal display device 30 of the present embodiment can be a side light type liquid crystal display device shown in FIG. 3. That is, a light source 37 of the liquid crystal display device 30 is located between the plastic frame 35 and a side surface of the light guide plate 32. At this time, the side surface of the light guide plate 32 is light incident surface of the light guide plate 32, and the light incident surface is perpendicular to the light emitting surface. Of course, the liquid crystal display device 30 of the present invention can also be a direct-light type. That is, the light source 37 of the liquid crystal display device 30 can also locate between the back plate 31 and a bottom surface of the light guide plate 32. At this time, the bottom surface of the light guide plate 32 is a light incident surface of the light guide plate 32, and is opposite to the light emitting surface.

Furthermore, the liquid crystal display device 30 further includes a first polarizer 381 and a second polarizer 382. The first polarizer 381 is located on a side of the array substrate 342 far away from the light guide plate 32. The second polarizer 382 is located between the color filter substrate 341 and the optical film 33. The other terminal of the light shading tape 36 can be clamped between the optical film 33 and the second polarizer 382 or be abutted against an edge of the second polarizer 382 in order to prevent the outer-lead-bonding (OLB) region of the liquid crystal display device 30 from generating a light leakage phenomenon. It should be understood that the other terminal of the light shading tape 36 can only be located at a non-display region of the liquid crystal display device 30.

It can be realized that the liquid crystal display device 30 shown in FIG. 3 is only a schematic diagram for illustrating the invention purpose of the embodiment of the present invention. Other structures or elements which are not shown can refer to the conventional art.

Figure 4:
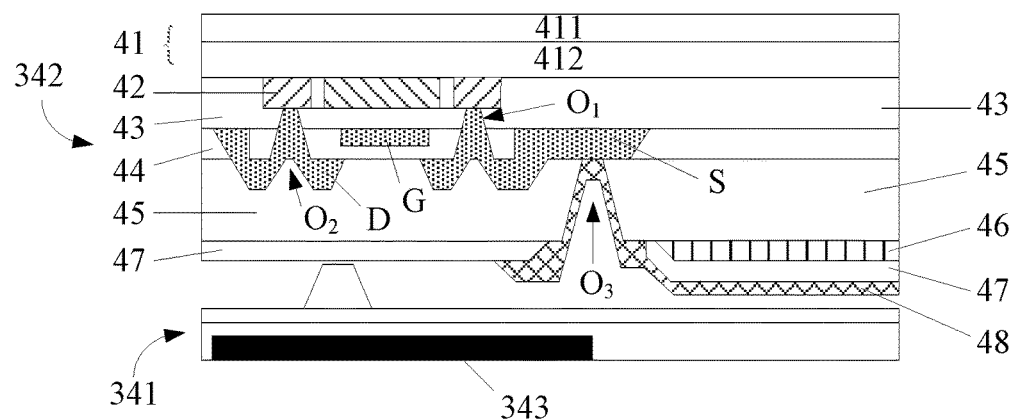
FIG. 4 is a schematic structure diagram of a display panel according to an embodiment shown in FIG. 3.

FIG. 4 is a schematic diagram of the display panel 34 shown in FIG. 3. As shown in FIG. 4 and using a Low Temperature Poly-silicon (LTPS) liquid crystal display device as an example, along a direction perpendicular to the display panel 34 and facing toward the light guide plate 32, the array substrate 342 of the liquid crystal display device 30 includes a base body 41, a polysilicon layer 42, an insulation layer 43, a gate electrode G, an interlayer dielectric layer 44, a source electrode S, a drain electrode D, a planarization layer 45, a common electrode 46, a common electrode 46, a passivation layer 47 and pixel electrode 48.

The base body 41 includes a substrate layer 411 and a buffering layer 412 formed on the substrate layer 411. The polysilicon layer 42 is located on the buffering layer 412 of the base body 41. The insulation layer 43 covers on the polysilicon layer 42 and the base body 41. The insulation layer 43 is provided with two first contact holes $O_1$. The gate electrode G is located on a region of the insulation layer 43 corresponding to the polysilicon layer 42. The interlayer dielectric layer 44 covers on the gate electrode G and the insulation layer 43, and the interlayer dielectric layer 44 is provided with two second contact holes $O_2$ corresponding to the two first contact holes $O_1$. The source electrode S and the drain electrode D are located on the interlayer dielectric layer 44 and are electrically connected with two terminals of the polysilicon layer 42 through the two first contact holes $O_1$ and the two second contact holes $O_2$. The planarization layer 45 covers on the source electrode S, the drain electrode D and the interlayer dielectric layer 44. Besides, the planarization layer 45 is provided with a third contact hole $O_3$.

The common electrode 46 is located on the planarization layer 45 except a region corresponding to a thin-film-transistor (including the gate electrode G, the source electrode S and the drain electrode D) of the array substrate 342. The passivation layer 47 is located on the planarization layer 45 and the common electrode 46, and the passivation layer 47 does not cover the third contact hole $O_3$. The pixel electrode 48 is located on the passivation layer 47, and is electrically connected with the source electrode S through the third contact hole $O_3$. Of course, the pixel electrode 48 can also electrically connect with a drain electrode D, not a source electrode S through the third contact hole $O_3$.

Figure 2:
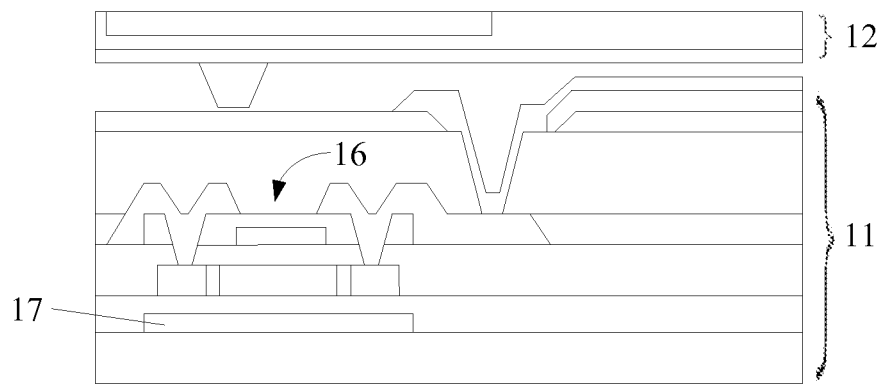
FIG. 2 is a schematic structure diagram of a display panel according to an embodiment shown in FIG. 1.

The color filter substrate 341 of the liquid crystal display device 30 is provided with a black matrix (BM) layer 343. The BM layer 343 is disposed corresponding to the TFT (polysilicon layer 42) on the array substrate 342. The opaque BM layer 343 can block the light emitted from the light-emitting surface of the light guide plate 32 to enter a region where the TFT is located in order to ensure a display contrast ratio of the liquid crystal display device 30. Comparing with the conventional array substrate 11 shown in FIG. 2, the array substrate 342 of the present embodiment does not require the metal light shading layer 17 shown in FIG. 2 so as to reduce the number and the type of the mask for manufacturing the array substrate 342, simplify the manufacturing process and reduce the production cost.

Besides, along a direction perpendicular to the display panel 34 and facing toward the light guide plat 32, the gate electrode G of the present embodiment includes a chromium (Cr) metal layer, an aluminum (Al) metal layer and a molybdenum (Mo) metal layer stacked sequentially. Because the Cr metal layer itself has a light shading property, when an external light transmit to a surface of the gate electrode G, the external light will not be reflected in order to ensure a display contrast ratio of the liquid crystal display device 30.

Figure 5:
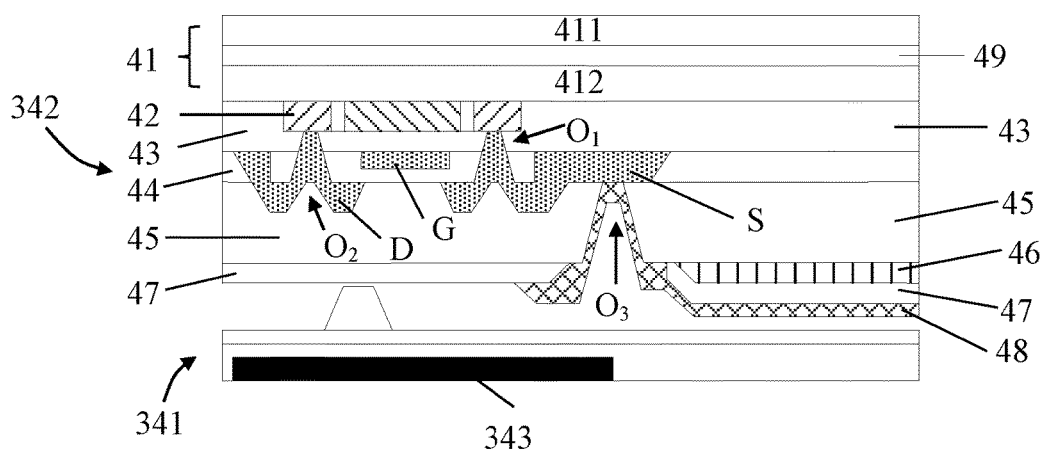
FIG. 5 is a schematic structure diagram of a liquid crystal display device according to another embodiment of the present invention.

FIG. 5 is a schematic structure diagram of a liquid crystal display device according to another embodiment of the present invention. As shown in FIG. 5, based on the embodiments described above, the display panel of the liquid crystal display device further includes a transparent electrode layer 49. The transparent electrode layer 49 can be a portion of the base body 41, and located between the substrate layer 411 and the buffering layer 412. Assuming that a wavelength of an external light is λ, a thickness d of the transparent electrode layer 49 can be disposed as $d=n*\lambda$, wherein, n is a positive integral. At this time, the external light is superposed with a light which is reflected and transmits out from the transparent electrode layer 49. Amplitudes of the two lights are equal and propagation directions are opposite so that the two light are cancelled with each other in order to ensure the display contrast ratio of the liquid crystal display device.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal display device, comprising:
    a back plate;
    a light guide plate located on the back plate and provided with a concave slot, wherein, a side wall of the concave slot is an incline slope, and a bottom surface of the concave slot is a light emitting surface of the light guide plate;
    an optical film located on the bottom surface of the concave slot;
    a display panel located above the optical film, and including an array substrate and a color filter substrate, wherein, the color filter substrate is adjacent to the optical film, and an edge of the color filter substrate is supported on the incline slope of the concave slot;
    a plastic frame disposed to surround a periphery of the light guide plate, wherein, one terminal of the plastic frame is fixed on the back plate, the other terminal of the plastic frame is fixed with the array substrate, and the plastic frame is aligned with an edge of the array substrate;
    a light source located between the plastic frame and a side surface of the light guide plate, and the side surface of the light guide plate is a light incident surface of the light guide plate; and
    a light shading tape for relatively fixing the color filter substrate and the light guide plate, wherein, light shading tape has a first terminal and a second terminal, the first terminal of the light shading tape is abutted against the plastic frame, and the second terminal of the light shading tape is abutted against or overlapped on an edge of the optical film;
    wherein, along a direction perpendicular to the display panel and facing toward the light guide plate, the array substrate includes:
    a base body;
    a polysilicon layer located on the base body;
    an insulation layer covering on the polysilicon layer and the base body, and is provided with two first contact holes;
    a gate electrode located on a region of the insulation layer corresponding to the polysilicon layer;
    an interlayer dielectric layer covering on the gate electrode and the insulation layer, and the interlayer dielectric layer is provided with two second contact holes corresponding to the two first contact holes;
    a source electrode and a drain electrode located on the interlayer dielectric layer, electrically connected with two terminals of the polysilicon layer through the two first contact holes and the two second contact holes;
    a planarization layer covering on the source electrode, the drain electrode and the interlayer dielectric layer, and the planarization layer is provided with a third contact hole; and
    a pixel electrode correspondingly located above the planarization layer, and electrically connected with the source electrode or the drain electrode through the third contact hole;
    wherein, the base body includes a substrate layer and a buffering layer formed on the substrate layer; and
    wherein, the base body further includes a transparent electrode layer having a thickness d and located between the substrate layer and the buffering layer, $d=n*\lambda$, wherein, $\lambda$ is a wavelength of an incident light which enters the transparent electrode layer from a side of the array substrate far away from the light guide plate, n is a positive integral.

2. The liquid crystal display device according to claim 1, wherein, the liquid crystal display device further includes a first polarizer and a second polarizer, the first polarizer is located on a side of the array substrate far away from the light guide plate, the second polarizer is located between the color filter substrate and the optical film, the second terminal of the light shading tape is clamped between the optical film and the second polarizer, or is abutted against an edge of the second polarizer.

3. The liquid crystal display device according to claim 1, wherein, along a direction perpendicular to the display panel and facing toward the light guide plate, the array substrate further includes:
    a common electrode located on the planarization layer except a region corresponding to a thin-film-transistor (TFT) of the array substrate; and
    a passivation layer located on the planarization layer and the common electrode, and the passivation layer does not cover the third contact hole;
    wherein, the pixel electrode is located on the passivation layer.

4. The liquid crystal display device according to claim 1, wherein, along a direction perpendicular to the display panel and facing toward the light guide plate, the gate electrode includes a chromium (Cr) metal layer, an aluminum (Al) metal layer and a molybdenum (Mo) metal layer stacked sequentially.

5. The liquid crystal display device according to claim 1, wherein, the color filter substrate includes a black matrix layer, the black matrix layer is disposed corresponding to the polysilicon layer.

6. The liquid crystal display device according to claim 1, wherein, along a direction perpendicular to the display panel and facing toward the light guide plate, a projection region of the optical film is located inside a region where the bottom surface of the concave slot is located.

7. A liquid crystal display device, comprising:
    a back plate;
    a light guide plate located on the back plate and provided with a concave slot, wherein, a side wall of the concave slot is an incline slope, and a bottom surface of the concave slot is a light emitting surface of the light guide plate;
    an optical film located on the bottom surface of the concave slot;
    a display panel located above the optical film, and including an array substrate and a color filter substrate, wherein, the color filter substrate is adjacent to the optical film, and an edge of the color filter substrate is supported on the incline slope of the concave slot;
    a plastic frame disposed to surround a periphery of the light guide plate, wherein, one terminal of the plastic frame is fixed on the back plate, the other terminal of the plastic frame is fixed with the array substrate, and the plastic frame is aligned with an edge of the array substrate; and a light shading tape for relatively fixing the color filter substrate and the light guide plate, wherein, light shading tape has a first terminal and a second terminal, the first terminal of the light shading tape is abutted against the plastic frame, and the second terminal of the light shading tape is abutted against or overlapped on an edge of the optical film;

wherein, along a direction perpendicular to the display panel and facing toward the light guide plate, the array substrate includes:

a base body;

a polysilicon layer located on the base body;

an insulation layer covering on the polysilicon layer and the base body, and is provided with two first contact holes;

a gate electrode located on a region of the insulation layer corresponding to the polysilicon layer;

an interlayer dielectric layer covering on the gate electrode and the insulation layer, and the interlayer dielectric layer is provided with two second contact holes corresponding to the two first contact holes;

a source electrode and a drain electrode located on the interlayer dielectric layer, electrically connected with two terminals of the polysilicon layer through the two first contact holes and the two second contact holes;

a planarization layer covering on the source electrode, the drain electrode and the interlayer dielectric layer, and the planarization layer is provided with a third contact hole; and a pixel electrode correspondingly located above the planarization layer, and electrically connected with the source electrode or the drain electrode through the third contact hole;

wherein, the base body includes a substrate layer and a buffering layer formed on the substrate layer;

wherein, the base body further includes a transparent electrode layer having a thickness d and located between the substrate layer and the buffering layer, $d=n*\lambda$, wherein, $\lambda$ is a wavelength of an incident light which enters the transparent electrode layer from a side of the array substrate far away from the light guide plate, n is a positive integral.

8. The liquid crystal display device according to claim 7, wherein, the liquid crystal display device includes a light source, the light source is located between the plastic frame and a side surface of the light guide plate, and the side surface of the light guide plate is a light incident surface of the light guide plate.

9. The liquid crystal display device according to claim 7, wherein, the liquid crystal display device further includes a first polarizer and a second polarizer, the first polarizer is located on a side of the array substrate far away from the light guide plate, the second polarizer is located between the color filter substrate and the optical film, the second terminal of the light shading tape is clamped between the optical film and the second polarizer, or is abutted against an edge of the second polarizer.

10. The liquid crystal display device according to claim 7, wherein, along a direction perpendicular to the display panel and facing toward the light guide plate, the array substrate further includes:

a common electrode located on the planarization layer except a region corresponding to a thin-film-transistor (TFT) of the array substrate; and a passivation layer located on the planarization layer and the common electrode, and the passivation layer does not cover the third contact hole;

wherein, the pixel electrode is located on the passivation layer.

11. The liquid crystal display device according to claim 7, wherein, along a direction perpendicular to the display panel and facing toward the light guide plate, the gate electrode includes a chromium (Cr) metal layer, an aluminum (Al) metal layer and a molybdenum (Mo) metal layer stacked sequentially.

12. The liquid crystal display device according to claim 7, wherein, the color filter substrate includes a black matrix layer, the black matrix layer is disposed corresponding to the polysilicon layer.

13. The liquid crystal display device according to claim 7, wherein, along a direction perpendicular to the display panel and facing toward the light guide plate, a projection region of the optical film is located inside a region where the bottom surface of the concave slot is located.

* * * * *